3,597,262
PRODUCTION OF WOOD-SYNTHETIC RESIN COMBINATIONS

Erich Bader, Hanau, and Hubert Koert, Gross-Auheim, Germany, assignors to Deutsche Gold- und Silber-Scheideanstalt vormals Roessler, Frankfurt am Main, Germany
No Drawing. Filed June 18, 1968, Ser. No. 737,820
Claims priority, application Germany, June 20, 1967, D 53,378
Int. Cl. B27k 3/00; B44d 1/14, 1/26
U.S. Cl. 117—73                                      6 Claims

ABSTRACT OF THE DISCLOSURE

In the production of wood-synthetic resin combinations by impregnation of wood with a liquid polymerizable composition and curing the polymerizable composition taken up by the wood, the impregnated wood is coated prior to curing with an aqueous or alcoholic solution of a film forming substance having hydrophilic groups and which substance is insoluble in the impregnating composition.

BACKGROUND OF THE INVENTION

Products, known as wood-synthetic resin compositions, are obtained by impregnation of wood with liquid polymerizable organic compositions and curing such compositions within the wood, which have a number of substantial advantages over normal wood. For instance, the hardness can be increased up to 900% over that of the natural wood, depending upon the type of wood and the synthetic resin concerned. The mechanical properties, such as, compression strength, tensile strength, bending strength and resistance to abrasion, can also be improved many times. Wood-synthetic resin combinations have considerably improved resistance to water, weathering and rotting. Also, wood of low strength can be used to produce products with special properties. A special advantage of the wood-resin combinations in question is that the appearance, the graining and color of natural wood are substantially retained although, if desired, colorations may be effected.

The curing of the polymerizable compositinns can be effected by irradiation, especially with γ rays and electron beams (Osterr. Chemiker-Zeitung, 67, 1966, pages 349–361).

In addition, a laboratory method has become known in which the polymerization is initiated catalytically with supply of heat. For this purpose a polymerization initiator, for example, an organic peroxide or an azo compound, is added to the polymerizable compositions (Holz-Zentralblatt No. 23, Feb. 22, 1967).

In all of the previously known processes high losses of the polymerizable monomer concerned in the liquid polymerizable composition used for the impregnation for the impregnated wood occur during an intermediate storage period, as well as during the curing, which, for example, in the case of methyl methacrylate can amount up to 90%. In one instance therefore attempts have been made to reduce such losses by heat sealing the impregnated wood in polyethylene bags. This not only is costly but also time consuming. In addition, this method does not offer a far-reaching protection against evaporation. In the other instance, the impregnated parts were wrapped in aluminum foil sealed with adhesive tape. This method is also very time consuming and costly, but also cannot be effectively carried out with irregularly shaped or large parts.

In both instances, encrustations occur on the surface of the wood during the polymerization in the catalytic curing or hardening, especially when the peak temperature is reached, and such encrustations must subsequently be removed, involving considerable substance losses.

DESCRIPTION OF THE INVENTION INCLUDING PREFERRED EMBODIMENTS

It is an object of the invention to provide a method of reducing the losses of monomers from wood which has been impregnated with liquid polymerizable compositions during intermediate storage and curing and at the same time prevent formation of encrustations during curing.

According to the invention it was found that this object could be achieved if the surface of the wood after its impregnation is heated prior to curing with an aqueous or alcoholic or aqueous alcoholic solution of film formers known per se which contain hydrophilic groups and are insoluble in the liquid polymerizable composition, which solution of film formers may also contain a wetting agent.

The impregnation of the wood can be effected with liquid polymerizable compositions which may contain polymerizable monomeric organic compounds or mixtures thereof, as well as, if desired, polymers dissolved in such monomers, as well as plasticizers and/or polymerization accelerators and/or polymerization initiators and/or hardener containing liquids with the aid of reduced pressure, such as, for example, has been described in our copending application entitled "Process for the Production of Wood and Synthetic Resin Combinations," corresponding to application Ser. No. 737,847, filed June 8, 1968, the disclosure of which is incorporated herein by reference.

The film formers which can be used according to the invention, for example, are water glass, alkyl cellulose, such as methyl celulose, and especially polyamides of the groups of mixed, branched and N-substituted polyamides which are soluble in water, alcohols and water alcohol mixtures. It is expedient to use solutions having a concentration of at least 2 wt. percent. Preferably, lower alkanols are used as the solvent alcohols.

In practical application of the process according to the invention the wood, for example, is taken from the impregnating bath and the excess impregnating liquid allowed to drip off for a short time and then while still in moist condition immersing the impregnated wood into a bath containing the film formers. It is, of course, also possible to spray the impregnated wood with the slution of the film former. Often it is expedient to add small quantities of a wetting agent to the solution of the film former, especially if it is an aqueous solution. When the soluble polyamides are employed as film formers it is advisable to add solution stabilizers, such as, aromatics or chlorohydrocarbons to the solutions thereof. With a very rough wood surface it is advisable to repeat the treatment with the solution of the film former. After the excess solution of the film former has been allowed to drip off for a short period of time, the parts may be cured in any desired manner, but it also is possible to store the treated parts before curing without taking any further measures.

Such treatment upon evaporation of the solvent causes the formation of a uniform film over the surfaces of the impregnated wood. In some instances it is of advantage if this film can be separated off. The substances used as film formers often are used as so-called parting agents. The primary object of the invention, however, is not to provide for a parting action, but rather to prevent the evaporation of the volatile portions of the impregnating liquid polymerizable composition to a far-reaching degree and at the same time prevent the inhibiting action of atmospheric oxygen on the polymerization during curing.

Formation of encrustations does not occur during the curing, so that further processing of the cured wood-synthetic resin combination is only necessary when a lacquering or polishing is required for special purposes.

The following examples will serve to illustrate the invention.

Example 1

A piece of red beech wood weighing 117 g. which had been predried overnight at +70° C. was immersed in an impregnating bath of the following composition:

| | Wt. parts |
|---|---|
| Methyl methacrylate stabilized with 50 p.p.m. of hydroquinone | 100 |
| Lauroyl peroxide paste (50% indioctyl phthalate) | 1 |
| Diacetyl peroxide solution (25% in dimethyl phthalate) | 1 | in an evacuatable vesel and subjected to repeated cycles of reduced pressure of about 35 torrs and reestablishment of normal pressure until the wood had taken up 69.5 g. of the impregnating liquid, corresponding to a filling of 59.5 wt. percent.

The impregnated sample was then immersed in a solution of the following composition:

| | Wt. parts |
|---|---|
| Polyvinyl alcohol (Type Moviol N 30/88) | 12 |
| Ethanol | 44 |
| Water | 44 | and thereafter cured for 4 hours at +60° C. in a circulating air drying cupboard.

The loss of polymerizable compound after curing was 4.5 g., corresponding to 6.5%, calculated upon the amount of impregnating liquid taken up by the wood. The surface of the wood had no encrustations.

Example 2

The impregnating procedure of Example 1 was repeated with a piece of red beech weighing 123 g. and the impregnated wood for comparison heat sealed in a polyethylene film 0.10 mm. thick. The quantity of impregnating liquid taken up by the wood was 5.5 g. corresponding to 53.2 wt. percent. After 4 hours' curing at +60° C., the loss was 11.5 g., corresponding to 17.6%, calculated upon the impregnating liquid taken up. In addition, encrustations were formed on the surface of the wood during curing.

Example 3

The procedure of Example 2 was repeated using a piece of red beech wood weighing 124 g., but no after-treatment or sealing of the impregnated wood was effected before curing.

The quantity of impregnating liquid taken up was 61.0 g., corresponding to 49.2 wt. percent. After 20 hours at +60° C. the curing was still insufficient in view of the inhibiting action of atmospheric oxygen. The loss of polymerizable substance was 54.5 g., corresponding to 89.4%, calculated on the impregnating liquid taken up.

Example 4

The impregnating procedure of Example 1 was repeated with a piece of red beech weighing 122.5 g. After the impregnation, the wood sample was immersed in a solution of the following composition:

10 wt. parts of a mixed polyamide produced from equal parts of (1) a salt of adipic acid and p,p'-diaminodicyclohexyl-methane, (2) carprolactam and (3) a salt of adipic acid and hexamethylene diamine
90 wt. parts of isobutanol.

The solution was kept warm so that it remained fluid.

The quantity of impregnating liquid taken up by the wood sample was 65.5 g., corresponding to 53.5 wt. percent. After immersion in the mixed polyamide solution, the impregnated sample was cured at +60° C. for 9 hours. The loss of polymerizable substance was 8.0 g., corresponding to 12 wt. percent, calculated upon the quantity of impregnating liquid taken up.

Example 5

A 113.5 g. piece of predried red beech wood was impregnated as in Example 1 using an impregnating bath of the following composition:

65 wt. parts monomeric methyl methacrylate stabilized with 50 p.p.m. of hydroquinone
35 wt. parts of a regulated prepolymer (partial polymerization product) of methyl methacrylate of a viscosity of 3200 cp. at +20° C., stabilized with 40 p.p.m. of hydroquinone
0.5 wt. part of lauroyl peroxide paste (50%)
0.5 wt. part of diacetyl peroxide solution (25%)

The quantity of impregnating liquid taken up was 75.0 g., corresponding to 66.0 wt. percent. The impregnated wood sample was then immersed in a film forming solution of the following composition:

| | Wt. parts |
|---|---|
| Sodium water glass | 85 |
| KOH | 10 |
| Water | 4 |
| Wetting agent, Peril®, liquid (a commercial dish washing detergent based on high molecular weight alkyl sulfates and alkyl benzene sulfonates) | 1 |

After 9 hours curing at +60° C., the loss of polymerizable substance was 12.7 g., corresponding to 16.9 wt. percent.

Example 6

The procedure of Example 5 was repeated except that a film forming solution of the following composition was used:

5 wt. parts of methyl cellulose (Methocel MS 25)
95 wt. parts of water 74.0 g. of impregnating liquid were taken up by the 115.5 g. sample of predried red beech wood, corresponding to 64.0 wt. percent. After 9 hours curing at +60° C., a weight loss of 11.8 g. was measured, corresponding to 15.9% of the quantity of the impregnating liquid taken up.

In comparison with Examples 5 and 6, the loss occurring, when the impregnated wood was cured without treatment with a film forming solution, was 43.4%.

Example 7

The procedure of Example 1 was employed using an impregnating liquid of the following composition:

65 wt. parts of methyl methacrylate unstabilized
35 wt. parts of a regulated prepolymer of methyl methacrylate, viscosity 3200 cp. at +20° C., stabilized with 40 p.p.m. of hydroquinone
1 wt. part lauroyl peroxide paste (50%)
1 wt. part diacetyl peroxide solution (25%)

With a poplar wood sample of 202 g., 186.0 g. of impregnating liquid were taken up, corresponding to 92.2%. With a red beech sample of 497 g., the quantity taken up was 233 g., corresponding to 46.9%. The film forming solution was the same as in Example 1.

After 4 hours curing at +60° C., the impregnated wood samples were hard. The impregnated poplar wood suffered a 22 g. loss, corresponding to 11.8% and the in.pregnated red beech sample suffered a 9.0 g. loss, corresponding to 3.9%.

The prepolymer of methyl methacrylate employed in Examples 5 and 7 was prepared from the following reaction mixture:

| | Wt. parts |
|---|---|
| Unstablized monomeric methyl methacrylate (MMA) | 99.1 |
| Ethylene glycol dimethacrylate | 0.4 |
| Octyl mercaptan | 0.5 |
| Azodiisobutyric acid dinitrile (AIBN) | 0.34 |

A single pot reaction was employed while stirring, the total quantity of the AIBN being added at once as a solution in MMA at an inner temperature of 75° C. The inner temperature of the reaction mixture was then maintained at 100° C. for 38 minutes and the mixture then rapidly cooled and stabilized with 40 p.p.m. of hydroquinone.

Example 8

The procedure of Example 1 was employed using an impregnation liquid of the following composition:

| | Wt. parts |
|---|---|
| Styrene (unstabilized) | 100 |
| Lauroyl peroxide paste (50%) | 2 |
| Diacetyl peroxide solution (25%) | 2 | with a red beech sample of 129.2 g., 78.5 g. of impregnating liquid were taken up, corresponding to 60.6%. The film forming solution was the same as in Example 4. After 20 hours curing at +60° C. in a circulating air drying cupboard the loss of polymerizable compound was 20.5 g. (=26.1%), calculated upon the amount of impregnation liquid taken up by the wood. Without aftertreatment the loss was 83.0%.

Example 9

The procedure of Example 8 was employed using an impregnation liquid of 70 wt. parts styrene (unstabilized) and 30 wt. parts acrylonitrile (unstabilized). A wood sample of 129 g. took up 82.7 g.=64.1% of the liquid. The film forming solution was the same as in Example 4.

After 20 hours hardening time at 60° C. the loss of polymerizable compound was 31.8 g.=38.5% calculated upon the amount of impregnating liquid taken up by the wood. Without treatment the loss is 92.2%.

Example 10

The procedure of Example 5 was employed using a 130 g. sample of wood which took up 85.2 g.=65.6% of the impregnation liquid.

The film forming solution had the following composition:

| | Wt. parts |
|---|---|
| Sodium water glass | 85 |
| Potassium hydroxide | 10 |
| Water | 4 |
| Wetting agent (Texapon N25®, a commercial fatty alcohol ether sulfonate) | 2 |

After 20 hours curing time at 60° C. the loss of polymerizable compound was 36 g.=42.2% calculated upon the amount of impregnating liquid taken up by the wood.

We claim:

1. The process for the production of a wood-synthetic resin combination comprising the steps of impregnating the wood with a liquid polymerizable composition; then coating the impregnated wood with a solution of a film former in at least one solvent selected from the group consisting of water and lower alkanols, said film former containing hydrophilic groups and being insoluble in the liquid polymerizable impregnating composition; evaporating said solvent to form a coating of the film former on the impregnated wood and curing the liquid polymerizable composition taken up by the wood, the coating formed by the film former preventing loss through evaporation of the impregnating composition and formation of encrustations prior to and during curing.

2. The process of claim 1 in which said solution of the film former also contains a wetting agent.

3. The process of claim 1 in which said film former is polyvinyl alcohol.

4. The process of claim 1 in which said film former is a mixed polyamide.

5. The process of claim 1 in which said film former is methyl cellulose.

6. The process of claim 1 in which said film former is water glass.

References Cited

UNITED STATES PATENTS

| 2,455,427 | 12/1948 | Loughborough | 117—148 |
| 2,591,768 | 4/1952 | Austin | 117—148 |
| 2,739,081 | 3/1956 | Wohnsiedler et al. | 117—148X |
| 2,804,398 | 8/1957 | Hooks | 117—148X |
| 3,190,767 | 6/1965 | Tomany et al. | 117—72 |
| 3,481,774 | 12/1969 | Kamal et al. | 117—148 |

WILLIAM D. MARTIN, Primary Examiner

R. HUSACK, Assistant Examiner

U.S. Cl. X.R.

117—69, 72, 93.31, 148